(12) United States Patent
Collet et al.

(10) Patent No.: US 11,238,502 B2
(45) Date of Patent: Feb. 1, 2022

(54) EXPERIENCE OPTIMIZATION

(71) Applicant: Bluecore, Inc., New York, NY (US)

(72) Inventors: Sophia Emma Nina Collet, New York, NY (US); Zahi Nadim Karam, Brooklyn, NY (US); Gino Knodel, New York, NY (US); Michael Brent Hurwitz, New York, NY (US); Victoria Leung, Wood-Ridge, NJ (US); Bahar Bipin Shah, New York, NY (US); Amber Victoria Tunnell, Brooklyn, NY (US); Max Solomon Bennett, Brooklyn, NY (US); Bryan Estes, Seattle, WA (US)

(73) Assignee: Bluecore, Inc., New York, NY (US)

( * ) Notice: Subject to any disclaimer, the term of this patent is extended or adjusted under 35 U.S.C. 154(b) by 0 days.

(21) Appl. No.: 16/824,446

(22) Filed: Mar. 19, 2020

(65) Prior Publication Data

US 2020/0320580 A1 Oct. 8, 2020

Related U.S. Application Data

(60) Provisional application No. 62/828,084, filed on Apr. 2, 2019.

(51) Int. Cl.
 *G06Q 30/02* (2012.01)
(52) U.S. Cl.
 CPC ..... *G06Q 30/0276* (2013.01); *G06Q 30/0244* (2013.01); *G06Q 30/0271* (2013.01); *G06Q 30/0277* (2013.01)
(58) Field of Classification Search
 None
 See application file for complete search history.

(56) References Cited

U.S. PATENT DOCUMENTS

| 7,013,290 B2 | 3/2006 | Ananian |
| 2001/0014868 A1 | 8/2001 | Herz et al. |

(Continued)

FOREIGN PATENT DOCUMENTS

WO WO2020205492 A1 10/2020

OTHER PUBLICATIONS

Kar et al., "Selection and Ordering of Linear Online Video Ads." In Proceedings of the 9th ACM Conference on Recommender Systems (RecSys '15). Association for Computing Machinery, New York, NY, USA, 203-210. (Year: 2015).*

(Continued)

*Primary Examiner* — Christopher B Tokarczyk
(74) *Attorney, Agent, or Firm* — Carr & Ferrell LLP

(57) ABSTRACT

Methods and corresponding systems are provided for configuring communications to customers when there are multiple campaigns scheduled in a given period. An optimal number of communications are sent prioritized according to business or performance measures where send times are spaced out in a manner that strives to attain the highest value. An example method includes determining a number of electronic communications, for a plurality of campaigns to send to the particular customer during a particular time period; determining the optimal send time during the particular time period; determining for which campaigns the particular customer is eligible; for each determined optimal time: determining a strategy including selecting an electronic communication for one of the campaigns to send to the eligible particular customer so as to maximize the value over the particular time period; and causing the selected electronic communication to be sent to the particular customer at the determined optimal time.

20 Claims, 3 Drawing Sheets

(56) References Cited

U.S. PATENT DOCUMENTS

| | | | |
|---|---|---|---|
| 2002/0184139 | A1 | 12/2002 | Chickering et al. |
| 2004/0036622 | A1* | 2/2004 | Dukach .................. G09F 27/00 340/691.6 |
| 2007/0127650 | A1 | 6/2007 | Altberg et al. |
| 2007/0244766 | A1 | 10/2007 | Goel |
| 2007/0271134 | A1* | 11/2007 | Ferry .................... G06Q 30/02 705/14.61 |
| 2012/0066065 | A1 | 3/2012 | Switzer |
| 2013/0024211 | A1 | 1/2013 | Monteforte et al. |
| 2014/0006142 | A1 | 1/2014 | Gaudet et al. |
| 2014/0032265 | A1 | 1/2014 | Paprocki |
| 2014/0143803 | A1* | 5/2014 | Narsimhan ........ H04N 21/4532 725/34 |
| 2014/0278918 | A1* | 9/2014 | Moran .................. G06T 3/0006 705/14.43 |
| 2015/0026719 | A1* | 1/2015 | Menon ................ H04N 21/812 725/34 |
| 2015/0213372 | A1 | 7/2015 | Shah |
| 2015/0348134 | A1 | 12/2015 | Jiang et al. |
| 2016/0189202 | A1 | 6/2016 | Wang et al. |
| 2016/0253709 | A1 | 9/2016 | Chen |
| 2017/0004408 | A1 | 1/2017 | Edelen et al. |
| 2017/0223137 | A1 | 8/2017 | Yu et al. |
| 2017/0236131 | A1 | 8/2017 | Nathenson et al. |
| 2018/0012253 | A1 | 1/2018 | Gavlovski et al. |
| 2018/0082213 | A1 | 3/2018 | McCord |
| 2018/0189843 | A1 | 7/2018 | Kulkarni et al. |
| 2018/0219808 | A1 | 8/2018 | Wala et al. |
| 2018/0240147 | A1 | 8/2018 | Stevens et al. |
| 2019/0034976 | A1 | 1/2019 | Hamedi et al. |
| 2019/0295004 | A1 | 9/2019 | Chaturapruek |
| 2019/0303980 | A1 | 10/2019 | Yan et al. |
| 2020/0027124 | A1 | 1/2020 | Knodel et al. |
| 2020/0320580 | A1 | 10/2020 | Collet et al. |
| 2020/0387936 | A1 | 12/2020 | Estes et al. |

OTHER PUBLICATIONS

"International Search Report" and "Written Opinion"; Patent Cooperation Treaty Application No. PCT/US2020/025163; dated Jun. 19, 2020; 7 pages.

Aarki, Inc., "The Importance of Frequency Management," [online], Sep. 4, 2017 [retrieved on Jun. 18, 2021], Retrieved from the Internet: <URL:https://web.archive.org/web20170904021955/https://WWW.aarki.com/blog/the-importance-of-frequency-management>2 pages.

Donnelly, "The Mising Link to Email Marketing Success—Frequency Optimization," [online], Dec. 10, 2017 [retrieved on Jun. 18, 2021], Retrieved from the Internet: <URL:https://www.theseventhsense.com/blog/email-send-frequncy-optimization>, 5 pages.

* cited by examiner

EXPERIENCE OPTIMIZATION

CROSS-REFERENCE TO RELATED APPLICATION

The present application claims the benefit of U.S. Provisional Application Ser. No. 62/828,084 filed Apr. 2, 2019. The foregoing cross-referenced application is hereby incorporated by reference in its entirety.

FIELD

The present technology relates generally to communications and more specifically, to configuring communication for multiple campaigns in a given period.

SUMMARY

This summary is provided to introduce a selection of concepts in a simplified form that are further described in the Detailed Description below. This summary is not intended to identify key or essential features of the claimed subject matter, nor is it intended to be used as an aid in determining the scope of the claimed subject matter.

In various embodiments, methods and corresponding systems for Experience Optimization (EO) are provided that achieve a significant improvement over existing Send Time Optimization (STO) approaches when there are multiple send time optimized electronic communication campaigns scheduled in a given period. The given period could be a day, week, month, etc., with the period divided into slots that are divisions of the respective period (e.g., minutes, hours, days, weeks, etc.). The term "campaign" as used herein refers to an organized course of action to promote or sell a product or service. Various embodiments reduce operational overhead while also improving performance by ensuring the optimal number of communications are sent prioritized according to business or performance measures and that the send times are spaced out in a manner that strives to attain the highest value.

In various embodiments, the send times are chosen based on a global customer value function that takes into account certain customer information, their current state and the current properties of the relevant time period to make a decision. In some embodiments, the global customer value function takes into account the customer's historical online activity, their current state and the current properties of the relevant time period to make a decision.

An example method includes receiving content and an audience from an entity for use for generating electronic communications for a plurality of campaigns, the audience including at least one particular customer who is an existing customer or a potential customer; determining a number of electronic communications, for a plurality of campaigns to send to the particular customer during a particular time period; determining the optimal send time during the particular time period; determining which campaigns the particular customer is eligible for; for each determined optimal time, determining a strategy including selecting one of the electronic communications for one of the campaigns to send to the eligible particular customer so as to maximize the value over the particular time period. The example method includes causing the selected electronic communications to be sent to the particular customer at the determined send times for the determined strategies.

DETAILED DESCRIPTION

Figure 1:
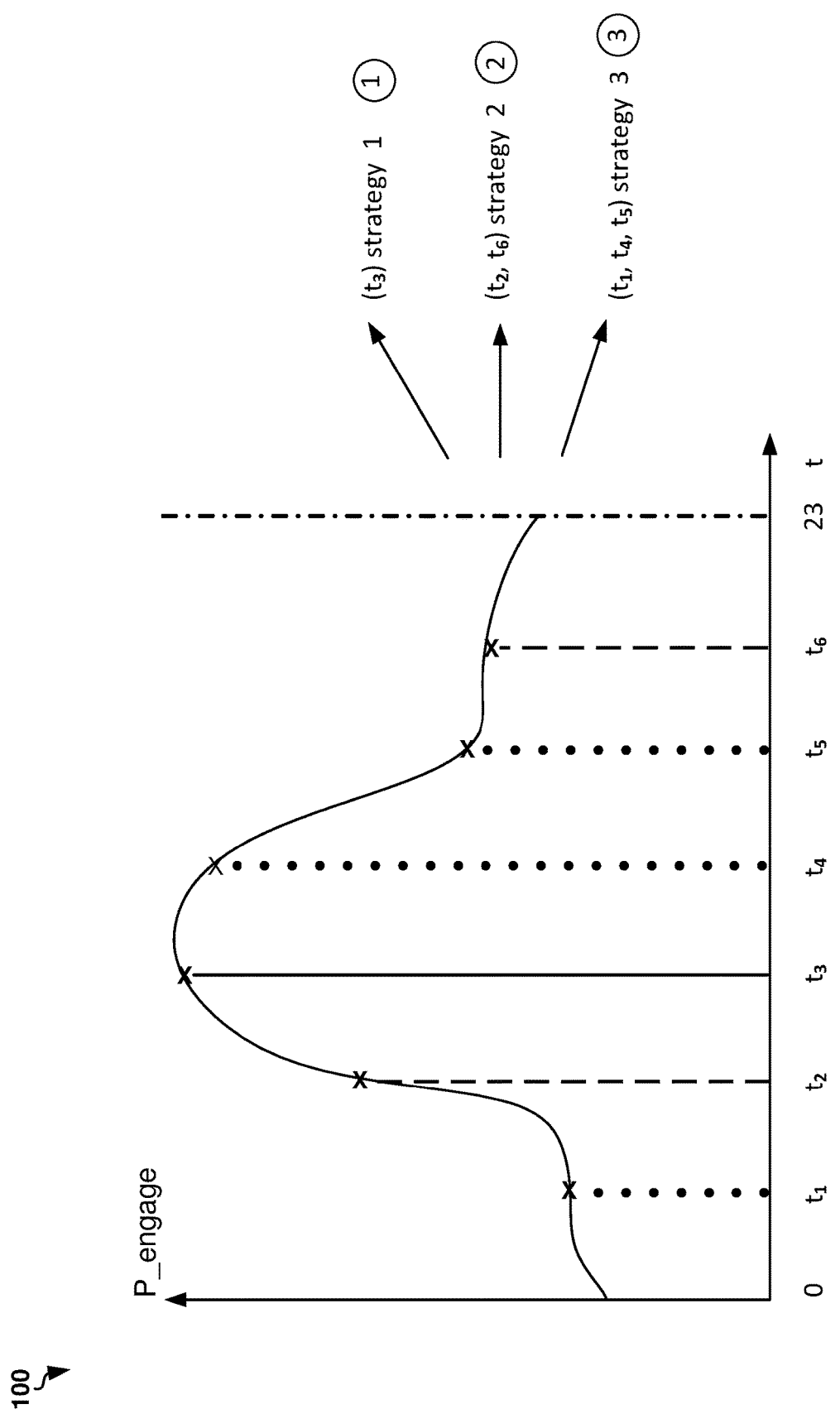
FIG. 1 is an example diagram illustrating strategy generation for a customer, including a value function for that one customer, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A", and "A and B", unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computing device (e.g., a desktop computer, a tablet computer, a laptop computer, or other computing device). The methods disclosed herein can also be implemented by a computing system implemented as a cloud-based computing environment, such as a virtual machine or container operating within a computing cloud.

Other known solutions are limited to handling one campaign in a predetermined time frame. For multi-campaigns, the client is typically asked to specify different non-overlapping time windows for each of the campaigns; otherwise a given user will receive either only one of the communications or multiple electronic communications at the same time. The service provider for the electronic communications may then take care of choosing the best time to send an electronic communication to the customer in each time window. For known solutions, the methods for choosing the "best" time are not robust enough for the multi-campaign case to determine the time that is best for optimal value in terms of the probability of engaging the particular customer or potential customer. Additionally, there is a significant operational overhead for the client in having to specify non-overlapping time frames in the multi-campaign case. What is needed is an improved solution for the multi-campaign case where there is a plurality of campaigns for which electronic communications are to be sent.

In various embodiments, the methods and corresponding systems for providing experience optimization comprise a model that decides the best communication schedule for each person (e.g., each potential recipient of a communication). The model can decide for each person when to send which communication. In operation in various embodiments, this decision of the model will not be restricted to one campaign sent over a certain time period or time interval: the model may make a decision at each time interval whether to send a communication or not. Therefore, the whole model, in various embodiments, effectively decides how many communications should be sent and at what times of the time period the communications should be sent to optimize for total engagement over the time period. The communication may be, for example, an email message, text message, or other type of messages electronic or otherwise non-electronic messages suitable for practicing various embodiments. The communication may be for marketing purposes (a marketing communication) or other purposes consistent with this specification.

Various terminology as used herein for various embodiments:

Send Time Value Function: a function defined over the certain time period or time interval that indicates the value of each given time interval of a fixed length, in terms of engagement (can include, but is not limited to value in terms of clicks, purchases or revenue). The time interval could be an hour, a day, a month, a year; other suitable time intervals may be used in other embodiments. In some embodiments, this value function may be defined in a personalized way and may depend on the person who is the intended recipient of the communications. This value function may also be defined within a date context: the value function may vary depending on the day of the week, or week/month of the particular year. The value function may be precomputed in some embodiments of the present technology and may be computed in real time (e.g., on the fly) in other embodiments.

Customer-proper attributes: characteristics of the customer including but not limited to age, gender, location (e.g., zip code), and/or product or campaign affinities of the intended recipient.

Behavior: including but not limited to online and offline behavior. Online Behavior can be a collection of online actions that a customer can perform and that various embodiments track. The collection includes, but is not limited to, opens or clicks on a communication, view/cart/ purchase of a product or a search on the client's website. The actions in the collection are first party data that is collected on behalf of clients by the provider, or third party data collected by others. Offline Behavior can include various data concerning customers visiting brick and mortar stores, making purchases from such stores, and/or joining a loyalty program, to name just a few examples.

Campaign Value: The value of a communication campaign can be defined in a multitude of ways including the engagement that can be expected when a given electronic communication is sent. This could be personalized such that the value of a campaign could not only be relative to the type of campaign itself, but also be relative to the intended recipient (customer or potential customer) of the communication (e.g., depending on the intended recipient's behavior and customer-proper attributes, to name just two examples). The Campaign Value can also be based on a business outcome, such as sell-through or margin goals.

Time Between Communications (TBC): time lapse between the reception of consecutive communications for a customer of a client.

Minimum Time Between Communications (MTBC): minimum allowed time between communications. For various embodiments, the MTBC can be set via multiple methods. For one, a client's global MTBC can be configured for global use to prevent any communication from being sent if the previous communication sent was less than MTBC time units before. In addition, each campaign can have custom MTBCs set up. The custom MTBC could be an MTBC that is configured to prevent the communication of that campaign from being sent if the customer (e.g., intended recipient) had received any other communications less than x time units earlier (x being selectable for customization). The custom MTBC may be set by automatic frequency capping. For background purposes only, it is noted that automatic frequency capping is further described in pending U.S. patent application Ser. No. 16/448,419, filed Jun. 21, 2019 which claims the benefit of U.S. Provisional Patent Application No. 62/693,295, filed Jul. 2, 2018. Another MTBC that may be used is configured to prevent the communication of that campaign from being sent if the customer got a specific type of communication less than a certain amount of time earlier, e.g., less than x hours earlier.

Messages in one-time and recurring campaigns system were historically scheduled by the client to send at a given time and cadence or frequency, e.g., noon on a given day or daily/weekly/monthly at 5 p.m. or every hour.

The methods and systems in various embodiments wake up at a given time-interval and for each of the campaigns scheduled to go out at that time, finds all the customers that qualify for the campaign. Whether a customer qualifies for a campaign is based on the audience that the client defines, as well as the MTBC setting.

According to various embodiments, a client no longer needs to set the time of day that the client wishes to send the communication. Instead, the client can set just the time period, e.g., day, or the cadence, e.g., daily/weekly/monthly. Various embodiments will then decide on a per-customer basis what is the best time to send the communication. If a client has multiple campaigns (e.g., a multi-campaign) scheduled for the same time period, a customer could end up qualifying for more than one of these campaigns. Therefore, various embodiments decide how many communications that customer will receive as well as the best time to send each of the communications; this decision is made in a manner that maximizes value over the whole time period. The value may be in terms of engagement of a customer including, for example, number of clicks, purchases or revenue.

In various embodiments, for each customer, the methods and systems determine an estimate of the value of each time unit (probability to engage at each time unit for that person). This can provide a value function (defined over the time period) for each customer that would indicate how valuable sending a communication at a certain time would be for that person. This value function can also depend on a broader date context, for instance, which day of the week or which week/month of the year the date is in. The value function may also take into account periodicity and seasonality. This value function may be determined using a machine learning model trained on historical data (e.g., past delivered times and other online behavior such as opens, clicks, purchases, etc.) and could be personalized (for instance taking into account customer-specific attributes and online/offline activity, to name just a few examples). Demographic and profile information for the particular customer may be used in the determination of the value function and resultant best send time. In some embodiments, these additional online activities may be used to group people together and find a common value function for people that show similar behavioral patterns (e.g., browsing the same website at the same time during the day).

Based on the determined value function, various embodiments select the best combination of x time slots (for x going from 1 to the maximum number of time optimized combinations, it is desired that the customer receive within one time period) to maximize engagement over the whole time period. In order to determine the best combination, various embodiments determine a function that gives the probability of a communication being sent (e.g., not being blocked by MTBC filters) for each TBC. The x-length tuple of times will be referred to as "strategy x", according to various embodiments. This can result in several tuples of distinct lengths.

FIG. 1 is an example diagram 100 illustrating strategy generation for a customer graphing the value function for one customer over a certain time period. In the example in FIG. 1, the time period is one day with 24 hour-long intervals, though the present technology is not limited to that example period and example intervals. In addition, the example in FIG. 1 shows a maximum of three send times per strategy but the present technology is not so limited. As explained above, the number of send times can be as high as how many defined time intervals can be present within the time period (e.g., within a day for the example in FIG. 1). For instance, if time intervals are defined to be hours, the maximum number of times could be 24. The value function and strategies may be precomputed in some embodiments and they may be computed in real time (e.g., on the fly) in other embodiments.

The resulting strategies in the example in FIG. 1 are:
Strategy 1: send one communication at time (t3)
Strategy 2: send two communications, at times (t2, t6), respectively
Strategy 3: send three communications, at times (t1, t4, t5), respectively There may be common hours across strategies (for instance, in the example in FIG. 1, t3 may replace t2 in strategy 2 which would have a common hour with strategy 1, or may replace t3 with t6 to have a common hour between strategy 1 and strategy 2.

A decision between strategies (e.g., regarding the number of communications to send: one communication, two communications, or x communications) may be made by looking at the customer state at each time during the time period that the customer is eligible for a campaign send. In various embodiments, the customer state is defined by customer eligibility. For example, the total number of campaigns the user is eligible for at that point in time can be necessary for defining the customer state since eligibility is essential in various embodiments. In other embodiments, the customer state may be defined by other attributes including but not limited to the value of the campaign(s) to which the customer is eligible; customer-proper attributes (such as age, gender, and product affinities to name just a few); customer online/offline activity, and optional attributes such as how late/early it is in the day, how many communications in each strategy are left, etc. Although the term "customer" is used, it should be appreciated that this may also be a potential customer who is not currently a customer. Based on the values for the attributes, the value of sending/not sending is estimated and a decision is made based on the estimate. In various embodiments, this decision effectively selects one of the strategies, which will then be followed (if possible, depending on eligibility, for instance) throughout the day.

In some embodiments, if for a given time, the decision is to send a communication and the customer is eligible for multiple campaigns, a decision is made as to which campaign of the multiple available campaigns to send (e.g., which campaign's communication to send). The decision on which of the campaigns to send can be based on which campaigns the customer is eligible for at that particular time, and those campaigns' values for that customer. In various embodiments, the operation of deciding which campaign is preferred over another can be made either using a global model or a personalized model, where the model can be trained based on first party or third party data to make the best decision for each customer.

Figure 2:
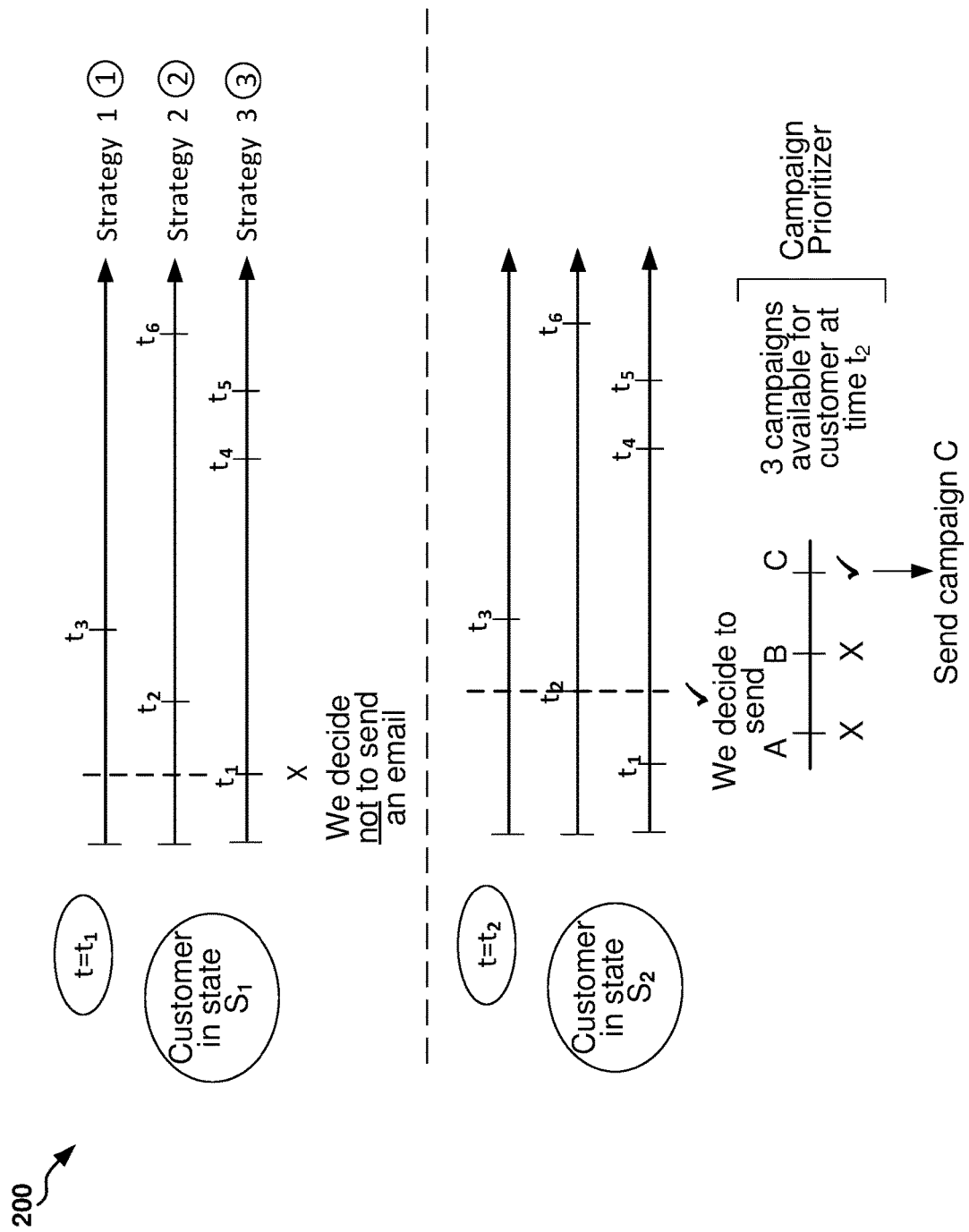
FIG. 2 shows an example schema that illustrates how certain aspects could be implemented for the same three customer strategies depicted in the example in FIG. 1.

FIG. 2 is a diagram 200 of an example schema that illustrates the operation of certain aspects for the same three customer strategies depicted in FIG. 1. In various embodiments, the method includes pre-generating all possible audiences for each campaign at each time interval (e.g., an hour in the example in FIG. 2) and then making a decision on whether or not to send the campaign.

In the example in FIG. 2, strategy 2 (communications at send times t2 and t6) can be chosen as the strategy to follow for this day. As can be seen, the decision whether to send depends on customer state (e.g., not send at time t=t1 if customer state is state S1 in the example in FIG. 2). At time t=t2, the customer state is S2 and a determination is made to send an electronic message for this time and state. A decision is made in this example, as to which of the multi-campaigns to send and campaign C was chosen. In accordance with strategy 2, after time t2, there will not be a send at time t3, time t4, or time t5. However, when time t6 is reached, a communication will be sent if possible (e.g., depending on customer state, for instance, if the user is eligible for any campaign at that time and other attributes are proper). Various customer state attributes are explained further above.

If the user is eligible for multiple campaigns at t6, the most valuable one is chosen (campaign C is excluded—even if the user is eligible for campaign C at t6 and even if campaign C was determined to be the most valuable one—since campaign C has already been sent at t2).

In some embodiments, if the time period is approaching the end (e.g., last hour of the day where time period is a day) and a particular customer is eligible to receive a communication during that time period for a particular campaign, then the communication may be sent even if that last hour is not necessarily the optimal send time.

Figure 3:
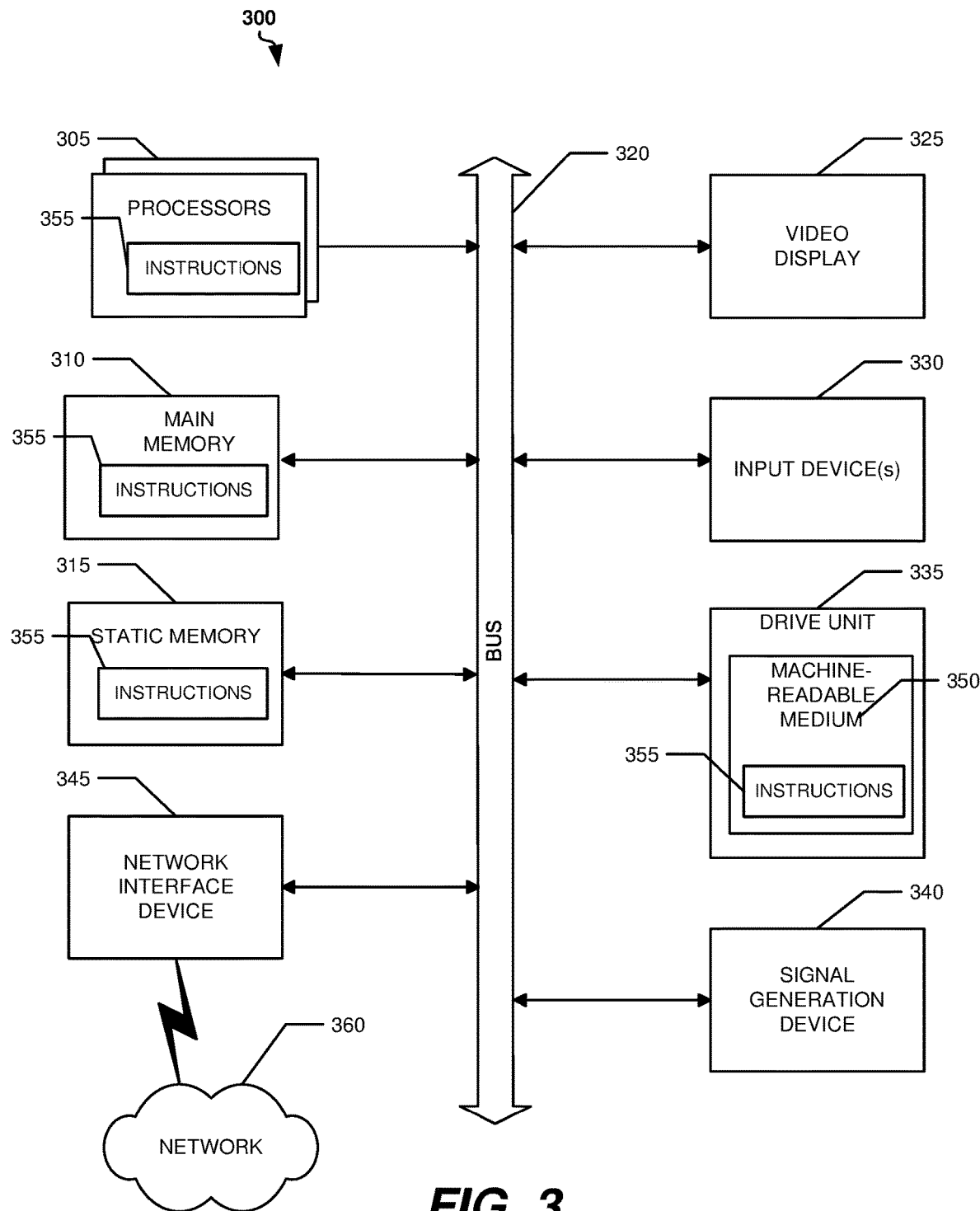
FIG. 3 is a simplified block diagram of a computing system, according to some embodiments.

FIG. 3 shows a diagrammatic representation of a computing device for a machine in an example electronic form of a computer system 300, within which a set of instructions for causing the machine to perform any one or more of the methods discussed herein can be executed. In example embodiments, the machine operates as a standalone device, or it can be operatively connected or networked to other machines. In a networked deployment, the machine can operate in the capacity of a server, a client machine in a server-client network environment, or as a peer machine in a peer-to-peer (or distributed) network environment. The machine can be a server, desktop personal computer (PC), laptop PC or any machine capable of executing a set of instructions that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein.

The example computer system 300 includes a processor or multiple processors 305 (e.g., a central processing units (CPU), a graphics processing unit (GPU), or both), a main memory 310, and a static memory 315, which communicate with each other via a bus 320. Computer system 300 can further include a video display 325 (e.g., a LCD, projector). Computer system 300 also includes at least one input device 330, such as an alphanumeric input device (e.g., a keyboard, keypad, remote control, graphical user interface, etc.), a cursor control device (e.g., a mouse), a microphone, a digital camera, a video camera, and so forth. Computer system 300 also includes a disk drive unit 335, a signal generation device 340 (e.g., a speaker), and a network interface device 345.

Drive unit 335 (also referred to as the disk drive unit 335) includes a machine-readable medium 350 (also referred to as a computer-readable medium 350), which stores one or more sets of instructions and data structures (e.g., instructions 355) embodying or utilized by any one or more of the methodologies or functions described herein. Instructions 355 can also reside, completely or at least partially, within the main memory 310 and/or the processors 305 during execution thereof by computer system 300. Main memory 310 and processors 305 also constitute machine-readable media.

Instructions 355 can further be transmitted or received over a communications network 360 via network interface device 345 utilizing one or more transfer protocols (e.g., Hyper Text Transfer Protocol (HTTP), Serial, and Modbus). Communications network 360 includes the Internet, television network, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, Digital Data Service (DDS) connection, Digital Subscriber Line (DSL) connection, Ethernet connection, Integrated Services Digital Network (ISDN) line, cable modem, Asynchronous Transfer Mode (ATM) connection, or a Fiber Distributed Data Interface (FDDI) or Copper Distributed Data Interface (CDDI) connection. Furthermore, communications also includes links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While machine-readable medium 350 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, RAM, ROM, and the like.

In some embodiments, the computing system 300 may be implemented as a cloud-based computing environment, such as a virtual machine operating within a computing cloud. In other embodiments, the computing system 300 may itself include a cloud-based computing environment, where the functionalities of the computing system 300 are executed in a distributed fashion. Thus, the computing system 300, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 300, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Python, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for communication via electronic messaging, the method comprising:

receiving content and an audience from an entity for use for generating electronic communications for a plurality of campaigns, the audience including at least one particular customer who is an existing customer or a potential customer;

determining a number of electronic communications, for a plurality of campaigns, to send to the particular customer during a particular time period;

determining optimal times during the particular time period to send each of the determined number of electronic communications, for the plurality of campaigns, to a computing device of the particular customer, wherein the number of electronic communications and the optimal times are determined to maximize values of a value function over the particular time period wherein:

the particular time period includes time intervals;

for a time interval of the time intervals, the value function is a probability that the particular person engages in the electronic communications at the time interval by at least opening the electronic communications on the computing device; and the determining the optimal times includes selecting a combination of the time intervals at which the probability is maximum;

determining that the particular customer is eligible for at least one of the plurality of campaigns;

for each determined optimal times:

determining a strategy including selecting an electronic communication of the plurality of campaigns' electronic communications to send to the eligible particular customer, so as to maximize the values over the particular time period of sending the campaign's electronic communications to the eligible particular customer; and for the determined strategy, sending the selected electronic communications to the computing device of the particular customer at the determined optimal times.

2. The method of claim 1, wherein the particular time period is a day, a week, a month, or a year.

3. The method of claim 1, wherein each of the plurality of campaigns is an organized course of action to promote and sell a product or service.

4. The method of claim 1, wherein the values and the strategy are precomputed.

5. The method of claim 1, wherein the values and the strategy are computed on-the-fly.

6. The method of claim 1, wherein the value function is a global value function that is a function of the probability of engaging the particular customer.

7. The method of claim 6, wherein the global value function is based on one or more of the following: certain information regarding the particular customer, a state of the particular customer, and current properties of the particular time period.

8. The method of claim 7, wherein the particular customer state is a function of the total number of campaigns for which the particular customer is eligible during the particular time period, and relative value of the campaigns to which the particular customer is eligible.

9. The method of claim 7, wherein the particular customer state is a function of customer-proper attributes including age, gender, product affinities, or online/offline activities of the particular customer.

10. The method of claim 7, wherein the customer-proper attributes further include time remaining in the particular time period and the number of electronic communications remaining to be sent for the particular customer during the particular time period.

11. The method of claim 7, wherein the certain information regarding the particular customer includes:

engaging, by the particular customer, with at least one of the number of electronic communications;

purchasing, by the particular customer, one or more products or services within a website associated with at least one of the number of electronic communications; and/or information concerning interactions of the particular customer with the website associated with at least one of the number of electronic communications.

12. The method of claim 11, wherein the certain information regarding the particular customer further includes:

location data for the particular customer;

offline behavior at a brick and mortar location by the particular customer; or timing of interactions of the particular customer with the website.

13. The method of claim 11, wherein the certain information regarding the particular customer further includes demographic information or profile information for the particular customer.

14. The method of claim 6, wherein the global value function is based on historical online and offline activity.

15. The method of claim 1, wherein each of the electronic communications includes an email message, text message, or other social media message.

16. The method of claim 1, further comprising training a model for the determining, for the particular customer, a number of electronic communications, for a plurality of campaigns, to send to the particular customer during a particular time period.

17. The method of claim 16, wherein the model is a global model.

18. The method of claim 16, wherein the model is other than a global model such that the model is personalized based on first party or third party data.

19. A system for communication via electronic messaging, the system comprising:

a hardware processor; and a memory communicatively coupled with the hardware processor, the memory storing instructions which when executed by the hardware processor performs a method, the method comprising:

determining for a particular customer a number of electronic communications, for a plurality of campaigns, to send to the particular customer during a particular time period;

determining optimal times during the particular time period to send each of the determined number of electronic communications for the plurality of campaigns to a computing device of the particular customer, wherein the number of electronic communications and the optimal times are determined to maximize values of a value function over the particular time period wherein:

the particular time period includes time intervals;

for a time interval of the time intervals, the value function is a probability that the particular person engages in the electronic communications at the time interval by at least opening the electronic communications on the computing device; and the determining the optimal times includes selecting a combination of the time intervals at which the probability is maximum;

determining that the particular customer is eligible for at least one of the plurality of campaigns;

for each determined optimal time, determining a strategy including selecting an electronic communication of the plurality of campaigns' electronic communications to send to the eligible particular customer, so as to maximize the value over the particular time period of sending the campaign's electronic communications to the eligible particular customer; and for the determined strategy, sending the selected electronic communication to the computing device of the particular customer at the determined best time.

20. A method for communication via messaging, the method comprising:

determining eligible customers for each campaign of a plurality of campaigns at each time interval of a time period, the eligible customers being existing customer or potential customers, and each of the plurality of campaigns being an organized course of action to promote and sell a product or service;

for a particular time of the time period, determining whether to send to a computing device of a particular one of the eligible customers an electronic communication of a particular one of the plurality of electronic campaigns based at least in part on a state of the particular eligible customer at the particular time, wherein the particular time being one of optimal times during the time period, the optimal times are determined to maximize values of a value function over the time period wherein:

the particular time period includes time intervals;

for a time interval of the time intervals, the value function is a probability that the particular person engages in the electronic communications at the time interval by at least opening the electronic communications on the computing device; and the determining the optimal times includes selecting a combination of the time intervals at which the probability is maximum;

wherein the state of the particular eligible customer is determined based on a total number of campaigns the particular customer is eligible for at the particular time, and the value of each of the campaigns to which the particular customer is eligible.

* * * * *